Aug. 31, 1948.                C. S. SZEGHO                2,448,476
                         CATHODE-RAY PROJECTOR TUBE
                           Filed Dec. 3, 1943
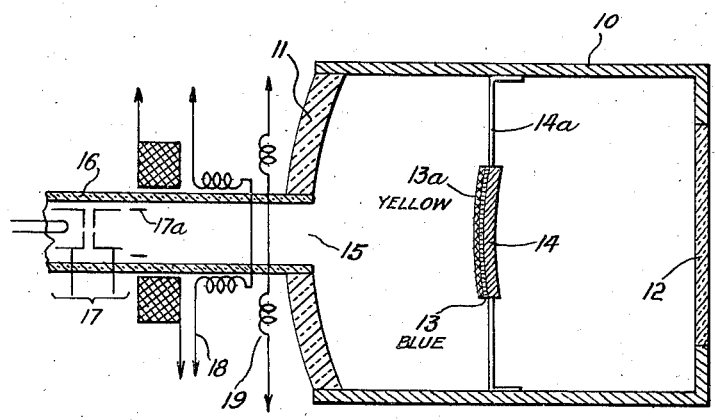
INVENTOR.
Constantin S. Szegho
BY
                    ATTORNEY Patented Aug. 31, 1948

2,448,476

UNITED STATES PATENT OFFICE 2,448,476

CATHODE-RAY PROJECTOR TUBE

Constantin S. Szegho, Chicago, Ill., assignor to The Rauland Corporation, Chicago, Ill., a corporation of Illinois Application December 3, 1943, Serial No. 512,710

6 Claims. (Cl. 250—164)

This invention relates to new and useful improvements in cathode ray projector tubes.

An object of the invention is a cathode ray tube having a fluorescent screen consisting of two or more layers of fluorescent material and adapted to project a clear, large image on the customary viewing screen.

A second object of the invention is to devise a projector type cathode ray tube having a long after-glow screen, i. e. which retains an image for an appreciable period of time.

A well-known arrangement for lengthening the after-glow of a fluorescent screen is to construct it of two superimposed or adjacent layers of fluorescent material, one of which is excited by the cathode ray beam and releases photons which, in turn, activate the second layer. For instance, one of the layers may consist of blue fluorescing zinc sulphide having a relatively short after-glow, and the second layer of yellow fluorescing zinc cadmium sulphide having a relatively long afterglow. The cathode ray beam excites the blue layer which then emits light to excite the yellow layer.

In end view cathode ray tubes, first the yellow layer is applied to the glass bulb and then on top of it the blue layer. It is the yellow layer that has the desired long after-glow, when exited by light given off by the blue layer. The glass window and the low secondary emission factor of the fluorescent screen deposited thereon cause the screen to acquire a negative charge when bombarded with high voltage electrons which are always present in projection tubes. The use of this arrangement for projection on a large viewing screen is, therefore, not practicable.

It has been suggested to place the yellow fluorescent layer on the viewing screen outside of the bulb enclosing the cathode ray tube and apply only the blue layer to the end wall of the bulb. However, in addition to the disadvantages mentioned, the fluorescent material on the screen cannot be enclosed within a moisture proof container.

In accordance with the present invention, the problem is solved by providing two or more layers of fluorescent material within a cathode ray tube which is provided with the elements of a Schmidt camera so arranged that the image of a long after-glow layer can be projected on the viewing screen.

In order more fully to explain the nature of the invention, an embodiment thereof will now be described as applied to the drawing which diagrammatically illustrates a tube in vertical cross-section.

The cathode ray tube envelope consists of a cylinder 10, one end of which is closed by a spherical mirror 11 and the other end by a correcting plate 12 such as is customarily used in a Schmidt camera. Between these two elements is located within the envelope a convex conductive support 14 carrying the customary blue layer 13 and yellow layer 13a, but in a reversed order, the yellow layer being nearest to the gun. These layers of fluorescent material are in alignment with a central opening 15 in the mirror 11 and they, as well as their mounting plate 14, are supported by arms 14a from the side walls of the cylinder 10. The shapes of the mirror 11 and of the plate 12 and their position with respect to one-another and with respect to the fluorescent layers, should be determined in accordance with the practice well-known in the construction of Schmidt camera type of optical systems. A neck 16 is attached to the mirror 11 and communicates with the envelope 10 through the central opening 15. The neck encloses the usual electron gun 17 and has associated with it the customary vertical and horizontal deflecting means 18 and 19.

The cylinder 10 may be of glass, metal, or ceramic material, and the envelope may be either evacuated and sealed off or it may be continuously pumped.

The image appearing on layer 13a will be reflected by the mirror 11 through the correcting plate 12 without interference from any refracting or absorbing medium and can thus be projected on the customary viewing screen through a suitable optical system.

The voltage applied to the electron gun should be such that the electrons penetrate the yellow layer 13a and lose the major part of their energy in the blue layer 13. By controlling the voltage applied to the accelerating anode 17a of the electron gun 17, the velocity of the electrons can be controlled. Thus the depth of penetration and the duration of the after-glow is also controlled.

A cathode ray tube of the type herein illustrated, is shown in my co-pending application, Serial No. 442,835. Many other types of cathode ray tubes of this general nature are illustrated in said application and may be adopted to good advantage for the purposes of the present invention.

What is claimed is:

1. In combination, two superimposed convex fluorescent layers the first layer having a long afterglow as related to the afterglow of the second layer, a support therefor, an electron gun emitting electrons which traverse the first layer and excite the second layer, an evacuated envelope enclosing said layers, support and gun, a spherical mirror facing the exposed surface of the first layer for reflecting light emanating therefrom, and a correcting plate in the path of the light rays reflected by said mirror.

2. The device according to claim 1, and in which one layer has a short after-glow as related to the other.

3. In combination, two superimposed fluorescent surfaces, a support therefor, an electron gun for generating electrons traversing the first and exciting the second surface, a mirror for reflecting light emanating from the first surface, a correcting plate in the path of the light rays reflected by said mirror, an evacuated envelope enclosing said surfaces and having a wall made up of the mirror, an opposite wall made up of said correcting plate and a neck enclosing said gun and projecting through a central aperture in said correcting plate.

4. The device defined in claim 3, and in which the first one of said surfaces has an after-glow which is long, relative to that of the second.

5. In combination, an electron gun emitting a stream of electrons, a first layer of fluorescent material through which said stream of electrons passes without substantial loss of electrons, a second layer of fluorescent material excited by said stream of electrons stopping in it, the second layer contacting the first layer and the light from the second layer exciting the first, a support for said layers, an evacuated envelope enclosing said layers, support and gun, and means including a mirror and correcting plate for projecting the image appearing on the first layer.

6. A device according to claim 5 and in which the first layer comprises a blue fluorescing material and the second layer a yellow fluorescing material, the afterglow of the first layer being long as compared to the afterglow of the second layer.

CONSTANTIN S. SZEGHO.

REFERENCES CITED

The following references are of record in the file of this patent:

UNITED STATES PATENTS

| Number | Name | Date |
|---|---|---|
| 2,096,986 | Von Ardenne | Oct. 26, 1937 |
| 2,099,023 | Levy | Nov. 16, 1937 |
| 2,137,118 | Schleede et al. | Nov. 15, 1938 |
| 2,177,691 | Dawihl et al. | Oct. 31, 1939 |
| 2,243,828 | Leverenz | May 27, 1941 |
| 2,295,779 | Epstein et al. | Sept. 15, 1942 |
| 2,305,855 | Epstein et al. | Dec. 22, 1942 |
| 2,307,188 | Bedford | Jan. 5, 1943 |
| 2,330,172 | Rosenthal | Sept. 21, 1943 |
| 2,372,359 | Cook | Mar. 27, 1945 |

FOREIGN PATENTS

| Number | Country | Date |
|---|---|---|
| 443,788 | Great Britain | Mar. 5, 1936 |
| 463,891 | Great Britain | Apr. 8, 1937 |
| 487,241 | Great Britain | June 16, 1938 |
| 640,056 | Germany | Dec. 21, 1936 |